(12) United States Patent
Nir et al.

(10) Patent No.: US 11,188,159 B2
(45) Date of Patent: Nov. 30, 2021

(54) SYSTEM, DEVICE AND METHOD FOR EXTERNAL MOVEMENT SENSOR COMMUNICATION

(71) Applicant: BO & BO LTD., Moshav Tzofit (IL)

(72) Inventors: Gadi Nir, Moshav Tzofit (IL); Eitan Merhavi, Shaarei Tikva (IL)

(73) Assignee: BO & BO LTD

( * ) Notice: Subject to any disclaimer, the term of this patent is extended or adjusted under 35 U.S.C. 154(b) by 0 days.

(21) Appl. No.: 16/762,939

(22) PCT Filed: Nov. 8, 2018

(86) PCT No.: PCT/IL2018/051210
§ 371 (c)(1),
(2) Date: May 10, 2020

(87) PCT Pub. No.: WO2019/092720
PCT Pub. Date: May 16, 2019

(65) Prior Publication Data
US 2020/0278757 A1    Sep. 3, 2020

Related U.S. Application Data

(60) Provisional application No. 62/583,948, filed on Nov. 9, 2017.

(51) Int. Cl.
*G06F 3/03* (2006.01)

(52) U.S. Cl.
CPC ..................... *G06F 3/03* (2013.01)

(58) Field of Classification Search
CPC ......... A63B 22/16; A63B 22/18; A63B 22/20; A63B 23/04; A63B 2022/0038; A63B 2022/185; G06F 3/016; G06F 3/017; G06F 3/03; G06K 9/00342
See application file for complete search history.

(56) References Cited

U.S. PATENT DOCUMENTS

| | | | | |
|---|---|---|---|---|
| 2009/0171616 | A1* | 7/2009 | Zhang | G01P 1/127 702/141 |
| 2011/0046519 | A1* | 2/2011 | Raheman | A61B 5/112 600/595 |
| 2012/0289378 | A1* | 11/2012 | Sperry | A63B 22/18 482/8 |
| 2014/0336947 | A1* | 11/2014 | Walke | A61B 5/6898 702/19 |
| 2015/0051867 | A1* | 2/2015 | Choi | G01C 22/006 702/160 |
| 2017/0164293 | A1* | 6/2017 | Hwang | H04W 52/0261 |

* cited by examiner

*Primary Examiner* — Rodney Amadiz
(74) *Attorney, Agent, or Firm* — Fresh IP PLC; Clifford D. Hyra; Aubrey Y. Chen (57) ABSTRACT

A system to provide direct communication between a computing device and an external movement sensor is herein provided, the system including an external movement sensor having a sensor communication unit; and a computing device with a *Nix OS configured to selectively utilize data/information received from the movement sensor via the movement sensor's communication unit.

16 Claims, 7 Drawing Sheets

SYSTEM, DEVICE AND METHOD FOR EXTERNAL MOVEMENT SENSOR COMMUNICATION

FIELD OF THE INVENTION

The present invention relates to the fields of physiotherapy, exercise, fitness, training and gaming. In particular, this invention relates to a system used for balance exercises and games.

BACKGROUND OF THE INVENTION

Substantially all current mobile computing/electronic devices based on *Nix Operating System (OS), such as smartphones, wearables and tablets (Android and IOS), contain accelerometer and gyroscope components, which is built-in on their printed circuit board (PCB). Those components function as an essential part of the device that enable measuring movement of the device. The movement data is typically transferred consistently and directly to the device operating system, for a wide range of uses, such as rotating screen orientation between landscape and portrait, controlling third-party apps (software applications) that are based on or make use of accelerometer or gyroscope type data, for example in games and measurement tools.

When an application that requires input from an integrated component such as an accelerometer is launched, the operating system requires permission to access data from that component. Once such permission is granted, the application automatically receives such data whenever the application is used.

Accelerometer and gyroscope-based apps are very common and easy to program, resulting in thousands of such apps being listed in app stores such as the Google Store and Apple Store. There are two primary ways to integrate accelerometer and gyroscope data into a mobile device application. The first way provides movement data to the application from the device's internal operating system. The second way requires programming of each specific app to receive data from specific external hardware that includes a gyroscope or accelerometer.

Even though most operating systems can integrate a wide range of external hardware (e.g., keyboard, mouse, speakers and more), currently typical operating systems lack the ability to receive gyroscope and accelerometer data directly from external hardware.

Furthermore, devices that are typically stationary (e.g., streamers, consoles, smart TVs and the like) do not contain accelerometers and/or gyroscopes, and because of this, they lack the ability to run applications based on those components.

WO 2016/098105 (BO & BO LTD, published on 23 Jun. 2016) discloses an electronic device configured to be fixed to a standing surface. The electronic device comprises: a processor; an accelerometer and/or a gyroscope sensor; and a transmitter configured to transmit commands to a remote device, based on data from the sensor.

SUMMARY OF THE INVENTION

The present system and method enables a computing/electronic device (hereinafter in the specification and claims used exchange-ably with computing device or derivatives thereof, and exemplified by smartphone or the like) to have direct communication with an external sensor, such as an accelerometer and/or gyroscope.

In accordance embodiments of one aspect of the present invention, there is provided a system configured to provide direct communication between a computing device and an external movement sensor.

The system includes an external motion/position/orientation sensor (hereinafter referred to as a movement sensor) having a (wireless) sensor communication unit; and a computing device (e.g. a smartphone) with a *Nix OS configured to selectively utilize data/information received from the movement sensor via the movement sensor's communication unit and a (wireless) computing device communication unit configured to operably communicate movement and orientation data/information with a remote device (e.g. a display such as a television, or computer console or screen). The computing device includes a file with instructions to selectively use the device's movement sensor(s) as well as use of the external movement sensor.

In some embodiments, the system uses a movement supporting Operating System runnable on a computing device; and at least one external movement sensor having a wireless sensor communication unit and disposed on or integrated with a movable object; wherein the OS comprises a file configured with instructions to execute commands to enable usage of the at least one external movement sensor, and whereby the movement communication system facilitates direct communication between the computing device and the at least one external movement sensor.

In some embodiments, the movement communication system OS is a *Nix OS.

In some embodiments, the movement communication system OS comprises a file configured with instructions to execute commands to enable selective usage of the device movement sensors of the computing device.

In accordance with embodiments of another aspect of the invention, there is provided a computing device with device movement sensors and a *Nix based OS, wherein the *Nix based OS comprises a file configured with instructions to execute commands to enable selective usage of at least one external movement sensor having a wireless sensor communication unit; and capable of neutralizing the device movement sensors during the selective usage of the at least one external movement sensor.

In further embodiments, the file described above is modified to include instructions to execute commands to operate applications that use movement data, wherein the movement data used to operate the application is from one or more external movement sensors.

In accordance with embodiments of another aspect of the invention, there is provided a method of facilitating direct communication between a computing device that has integrated device movement sensors and runs a *Nix OS and at least one external movement sensor having a wireless sensor communication unit, the method including
  running one or more files of the *Nix OS with instructions to execute commands to enable selective usage of the at least one external movement sensor; and capable of neutralizing the device movement sensors during the selective usage of the at least one external movement sensor.

In some embodiments, the method includes selective usage of one or more external movement sensors and one or more internal movement sensors.

In further embodiments, the method includes running a plurality of *Nix supported training/treatment/challenge games or applications on the computing device, wherein the training games use movement data communicated from the one or more external movements sensors to the *Nix OS.

It should be noted that typical home game consoles, such as Wii™, have specific content for specific movement sensors and those sensors are integrated with a (typically) handheld pointing device.

The present invention incudes an interface with a mobile computing or communications device operated using an operating system (OS), for example, a *Nix OS, that supports movement and position data, hereinafter referred to as movement data (e.g., from an accelerometer, gyro meter etc.). Substantially any games, programs or applications that integrate movement data can be run on *Nix OS's, and may be adapted to integrate external movement or position sensors, according to some embodiments of the present invention. For example, in some embodiments, the sensor(s) that are integrated into the computing device and that are supported by the OS of the computing device is/are nullified. The OS is modified to remove the movement function so it does not operate with the internal movement sensor, rather the OS protocol is adapted to support communication with an external movement or movement sensor (e.g., accelerometer or gyro meter)). This change in normal OS functionality is not obvious as works against the expected usage.

Embodiments of the present invention can allow use of the computing device with a default usage of its internal sensor, but use one or more external movement sensors to work all Applications. The invention can be used to support a wide range of applications that involve motion/movement, such as health Apps, games, therapy Apps and so on. Supported Apps are not restricted to a specific SDK, rather the OS is adapted to support substantially all apps, from different developers and companies.

BRIEF DESCRIPTION OF THE DRAWINGS

The principles and operation of the system, apparatus, and method according to the present invention may be better understood with reference to the drawings, and the following description, it being understood that these drawings are given for illustrative purposes only and are not meant to be limiting, wherein.

DETAILED DESCRIPTION OF EMBODIMENTS OF THE INVENTION

The following description is presented to enable one of ordinary skill in the art to make and use the invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and features herein disclosed. In other instances, well-known methods, procedures, and components have not been described in detail so as not to obscure the present invention.

Embodiments of the present invention relate to mobile and stationary computing devices that are capable of running movement related programs or applications, such as Nix based Operating Systems (OS), such as Android and IOS devices. Such computing devices may be mobile devices, such as Smartphones, Tablets, wearables and/or laptops; or such devices may be stationary devices, such as consoles, streamers, and/or smart TV's etc. Other devices may also be used.

Some embodiments of the present invention relate to external movement sensor management using a communication method between a mobile device an external movement sensor, for example an accelerometer and/or gyroscope, to an Operating system that runs applications based on accelerometer and gyroscope, usually by using their built-in hardware.

The present Operating System, which allows a method of direct communication with an external accelerometer and/or gyroscope, opens the computing device to a wide range of new purposes.

According to a first example, a mobile computing device user may tilt an external movement sensor to control all accelerometer/gyroscope-based apps without needing to tilt or move the mobile device to use those kinds of apps.

According to a second example, a stationary device user may access a whole new world of content that was not available, since accelerometer/gyro-based applications may be played and controlled by an external movement sensor. For example, the user can tilt or move the external movement sensor to control games.

According to a third example, a game controller may be implemented by attaching the external movement sensor to another object (e.g., ball, bat, surfing board, etc.) and/or to a body part (e.g., hands, feet, head, etc.) to turn that object or body part into a game controller. For example, a user can roll a ball, tilt a board, wave a hand, head or leg etc., to control "accelerometer" or "movement" type games.

Some embodiments of the present invention include a system, method and/or means for facilitating direct communications between external movement sensors and computing or communications devices. In some embodiments, systems and methods are provided for enabling real-time game controlling using an external movement sensor on an object connected wirelessly to a computing device.

There is provided, in accordance with embodiments of an aspect of the present invention, an external movement data enabled operating system (OS) including a combination of hardware and software, integrated into a computing or communications device, whether a mobile or stationary device that runs a *Nix based OS, such as Android and IOS having an integrated functionality to use movement data.

In some embodiments, the external movement sensor includes a movement sensor, such as an accelerometer and/or gyroscope component, a wireless transmitter, such as Bluetooth, and a power source, such as a battery.

Further, in order to provide quality and accurate data, the movement sensor may include an accelerometer noise filter and/or a Central Processing Unit (CPU), for example, to configure data transfer frequency, accuracy, etc. to help optimize the movement sensor data.

In some embodiments, an operating system code on a mobile and/or stationary device operating system is modified to enable data received directly from the external movement sensor to be used in movement related applications or functions. In one example, after connected to (run on) the device's operating system code (hereinafter also referred to as "movement code"), the movement code neutralizes movement sensor elements of the existing operating system code, and modifies the device's operating system code accordingly. For example, elements of the internal accelerometer/gyroscope data channels may be blocked, since this kind of data should be received from the external movement sensor only.

Furthermore, after disconnecting the external movement sensor from the device's operating system, the OS should return automatically to the original status, such that the internal accelerometer/gyroscope data can once again be received from the operating system of the device.

According to some embodiments, the device operating system code is configured to ensure a stable and convenient application of the external movement data in conjunction with adjustment of the external movement sensor to communicate directly with the computing device. For example, elements in the code responsible for the screen orientation must continue to receive data from the internal accelerometer/gyroscope, otherwise the screen orientation constantly changes as the external accelerometer/gyroscope moves. On the other hand, elements in the code responsible for transferring the accelerometer/gyroscope data to third party applications should receive data only from the external accelerometer/gyroscope. Further, there are other elements in the OS code that use the accelerometer. For example, code responsible to monitor user movement in sleep mode should remain active in sleep mode to determine device usage, and therefore such code should not receive movement data from the external accelerometer/gyroscope, to avoid having the external accelerometer initiate sleep mode for a device.

In addition, the internal accelerometer, by definition, moves along with the device. Therefore, while using applications in different orientations, different axes may be activated by the internal accelerometer/gyroscope. For example, when the user uses apps based on the accelerometer in portrait orientation, tilting to the right and left is performed on the X axis. When the user uses apps based on accelerometer in the landscape orientation, tilting to the right and left is performed on the Y axis. Each app therefore should know how to receive the appropriate data according to the device's orientation. According to some embodiments, the operating system code responsible for third-party applications is configured to requires adjustment of the accelerometer data correspondingly to the current application's screen orientation. This embodiment addresses the situation where there is an external accelerometer/gyroscope that does not move along with the device, whereby there may be a mismatch an external movement sensor and applications, which interfere with the proper operation of the applications.

Figure 1:
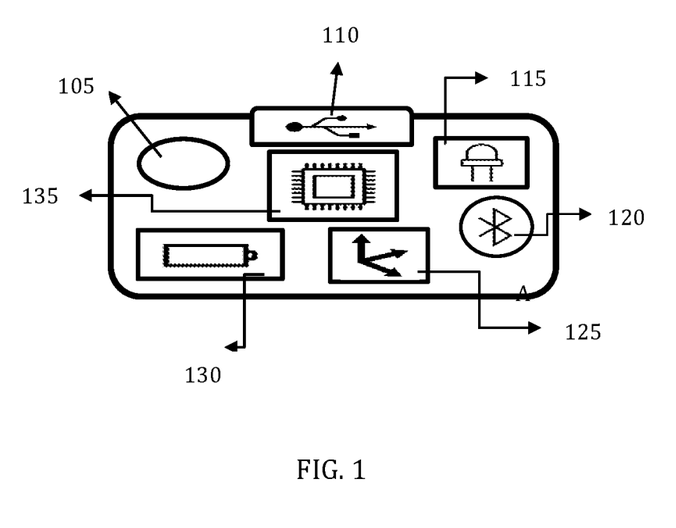
FIG. 1 is a schematic view of an external movement sensor, according to some embodiments of the present invention.

FIG. 1 illustrates a computing device's external movement sensor 100, in accordance with embodiments of the present invention. including a power/mode actuator or button 105; a micro-USB Port 110; a RGB LED 115; a Bluetooth chip 120; a movement sensor 125 (e.g., accelerometer, gyroscope); a power source 130, for example a rechargeable battery; and a CPU 135. The external movement sensor 100 may also include, one or more movement, proximity or other movement related sensors. The computing device can be, for example, a smartphone, a laptop computer, a tablet computer and the like.

Figure 2:
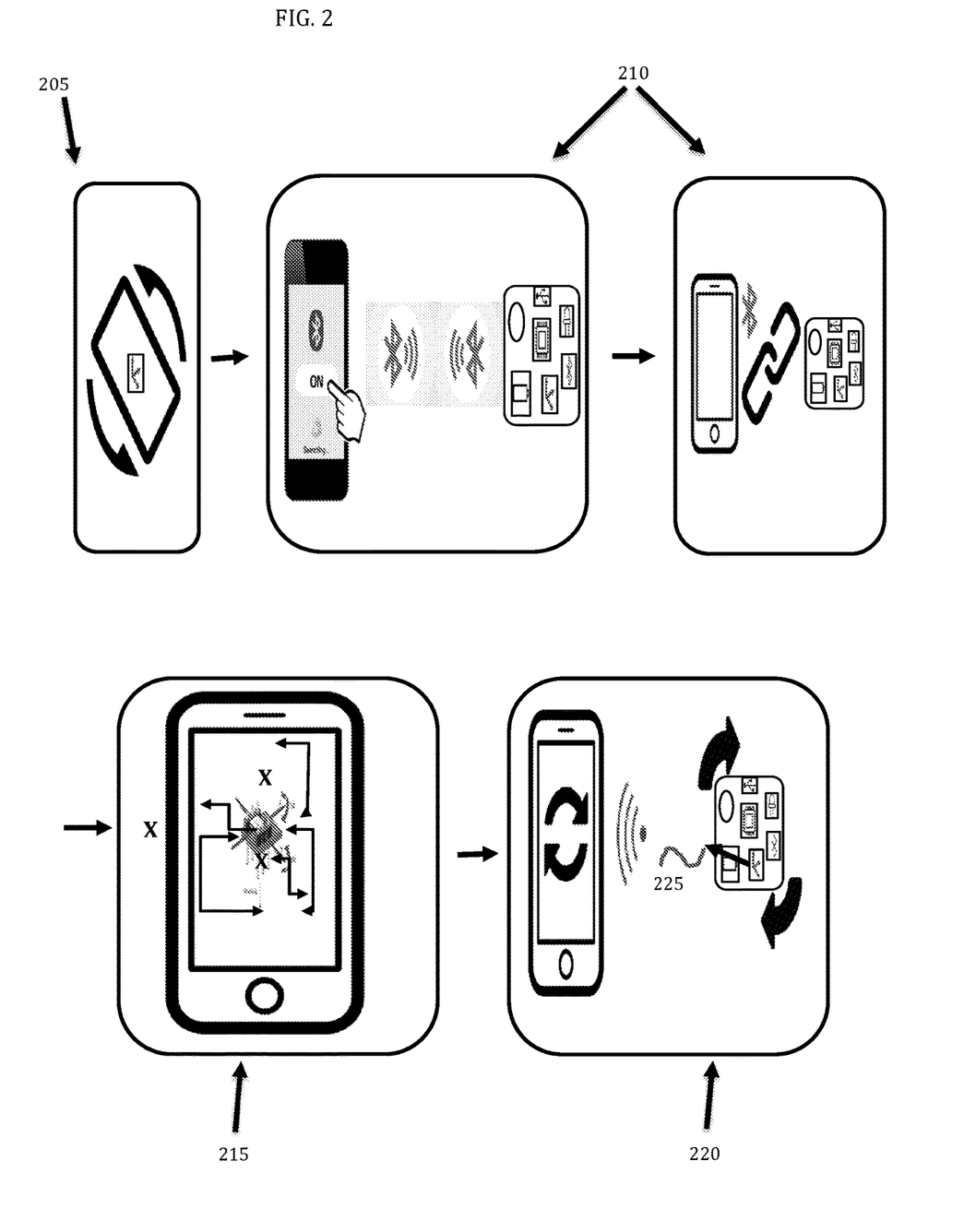
FIG. 2 is a flow diagram illustrating a pairing-connecting/disconnecting process of the external movement sensor, according to some embodiments.

FIG. 2 shows a process by which the pairing-connecting/disconnecting of the external movement sensor 100 may undergo a pairing-connecting/disconnecting, according to some embodiments. Step 205 illustrates the default operation when the device's apps and functions receive the integrated accelerometer/gyro's data. Step(s) 210 illustrate(s) the pairing and connecting process, showing the enabling of the device's Bluetooth, causing the device to consistently and automatically search for the Bluetooth address of external movement sensor 100. When powering on the external movement sensor 100, the external movement sensor consistently and automatically advertises its own Bluetooth address, thereby after Bluetooth identified by the device, the mobile and/or stationary device and external movement sensor 100 are paired and connected. Step 215 illustrates examples of the device operating system code modifications. For example, after the external accelerometer is paired and connected to the computing device, one or more elements in the OS code that use integrated accelerometer data are completely blocked, as shown by the "X"'s. Step 220 illustrates new data channel(s), shown by arrow 225, that are opened on the device OS to start receiving the external device's accelerometer data, specifically in the code elements that have been modified to ignore the integrated accelerometer data, so as to enable the device OS to receive external movement data only from the external movement sensor, to which it is connected.

FIGS. 3A-3G depict several examples of adjustments and changes in operating system code, to manage mismatching between external movement sensor 100 and applications and optional solutions.

Figure 3A:
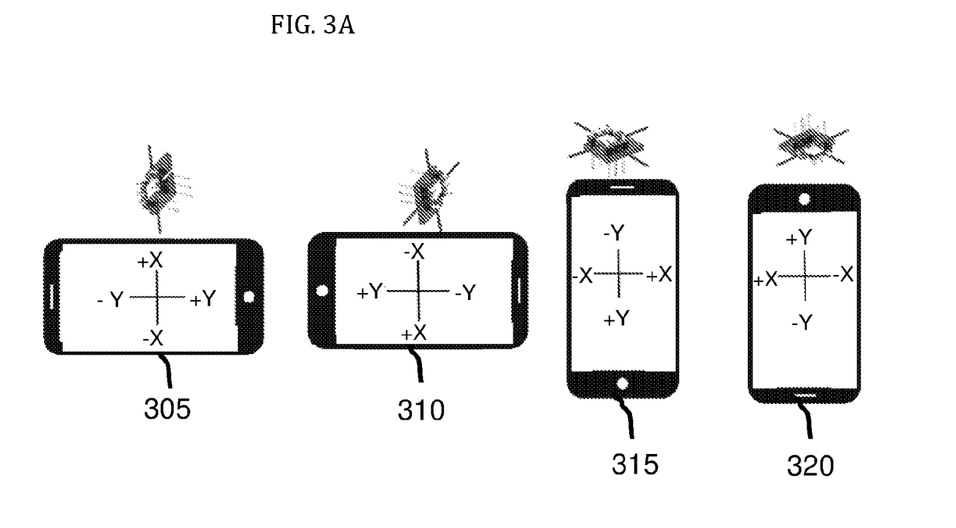
FIGS. 3A-3G show examples of adjustments and changes in operating system code, to manage mismatching between the external movement sensor and applications, and optional solutions.

FIG. 3A illustrates an example of the default status of a mobile device, whereby movement related apps use integrated accelerometer data. When using accelerometer-based apps, the integrated accelerometer transmits movement data corresponding to the accelerometer's orientation. This feature enables using accelerometer-based apps in all four orientations to enable a user to hold their computing device such as a smartphone 50 in any orientation, and the app responds accordingly. In orientation 305 the computing device is shown in landscape orientation; in orientation 310 the device is shown in the opposite landscape orientation; in orientation 315 the device is shown in portrait orientation; and in orientation 320 the device is shown in the opposite portrait orientation.

Figure 3B:
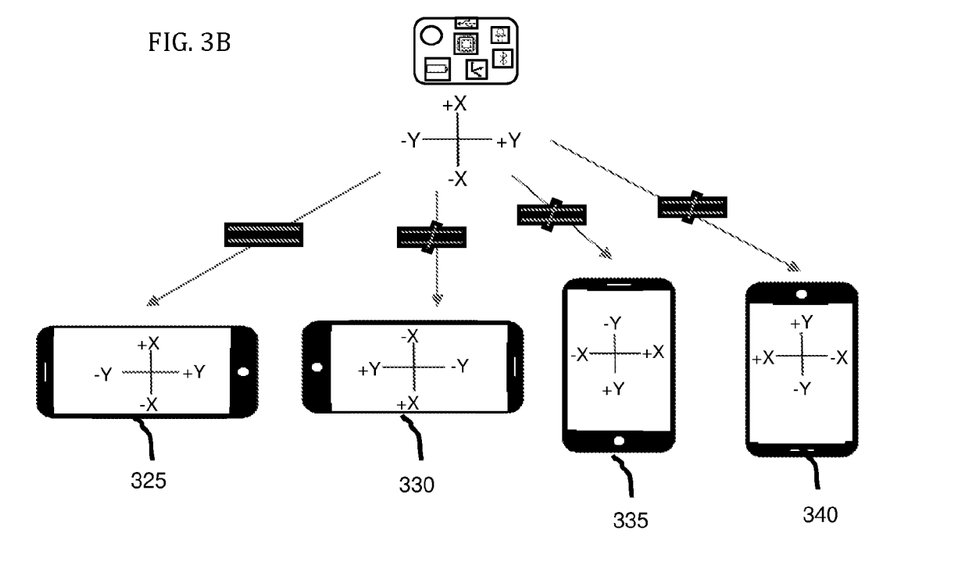

FIG. 3B illustrates the challenge of mismatching between external movement sensor 100 and app orientation. For example, if an application is configured to run with a smartphone's accelerometer that works with a fixed configuration of axis, and the application now works with an external accelerometer that has no fixed configuration of axis, this may lead to a mismatch of orientation and may be confusing or disturbing for the user. As can be seen, at 325 the computing device 50 is depicted by smartphone 50, which is in a landscape orientation, such that the app works correspondingly to the external accelerometer movement. At 330 the mobile device is in the opposite landscape orientation, whereby there is no match between the app and the external accelerometer movement. At step 335 the mobile device in portrait orientation, whereby there is no match between app and the external accelerometer movement. At step 340 the mobile device is in opposite portrait orientation, whereby there is no match between app and the external accelerometer movement.

Figure 3C:
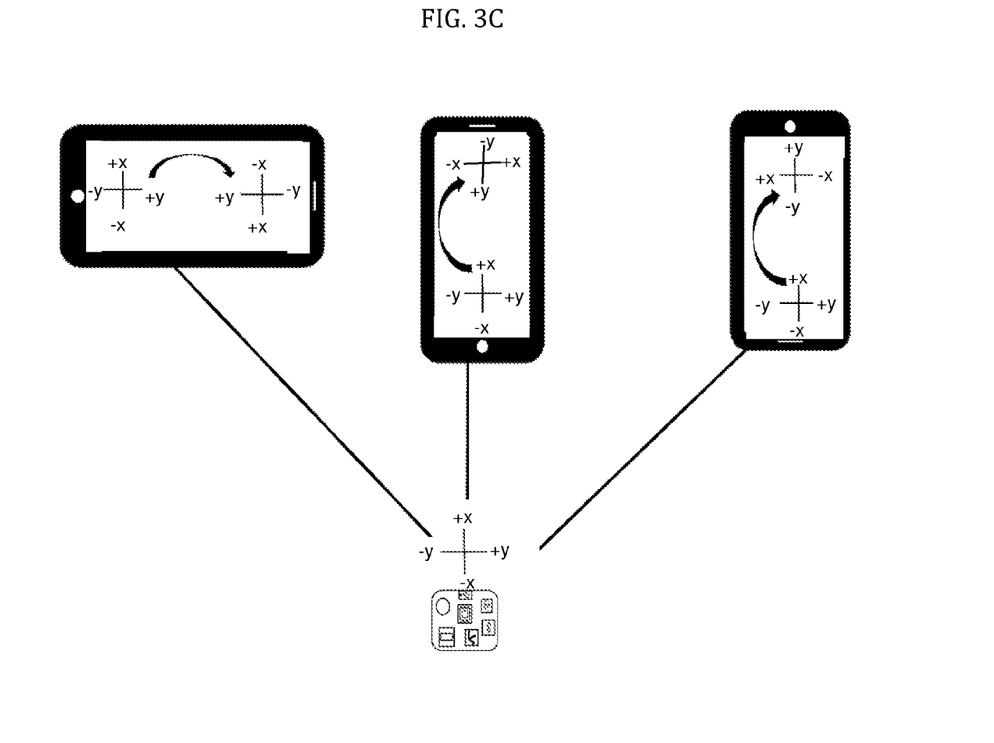

FIG. 3C illustrates an example of a solution for the challenge demonstrated in FIG. 3B. As can be seen, code matching can be used to enable the external accelerometer data received to be automatically adjusted correspondingly to the device's orientation.

Figure 3D:
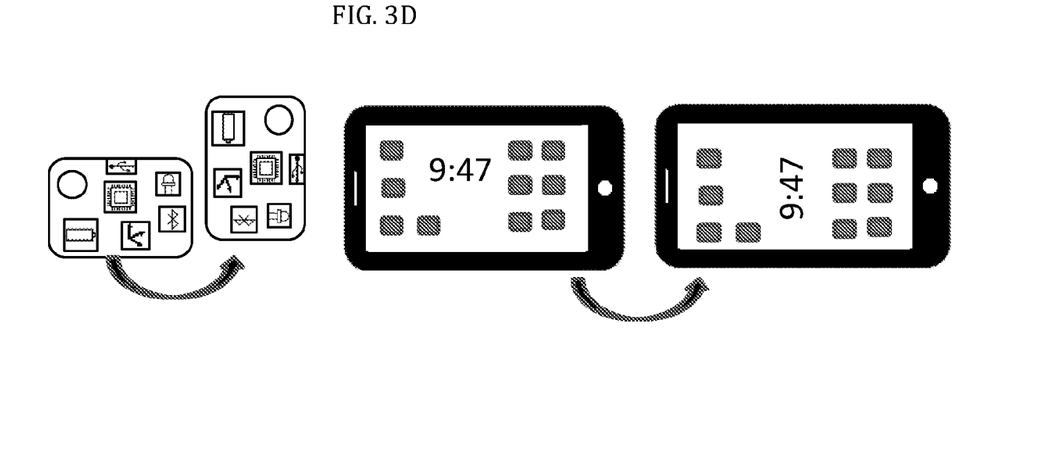

FIG. 3D illustrates another screen orientation challenge, wherein tilting the external accelerometer causes device's screen rotation, that may interrupt the user interface and experience.

Figure 3E:
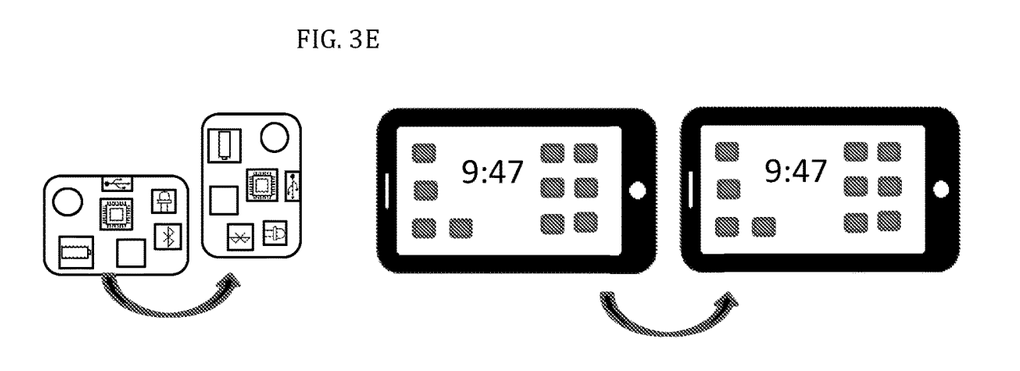

FIG. 3E illustrates an example of a solution for the problem demonstrated in FIG. 3D, wherein selected integrated accelerometer data channels are instructed to remain open after the external accelerometer is paired and connected to the device. As can be seen, while some parts of the integrated accelerometer data channel are completely blocked, the screen display orientation channel proceeds to receive data from the integrated accelerometer.

Figure 3F:
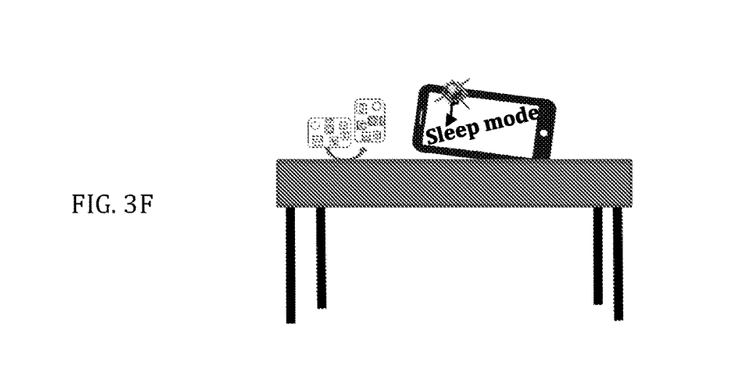

FIG. 3F illustrates another challenge wherein the device is automatically turned off, after not using it. For example, while using the external accelerometer to control an app that runs on the device, the device may be operated, yet without any movement. After not moving the device for some time, data that is supposed to be received from the integrated accelerometer and device may automatically go into an unwanted sleep mode.

Figure 3G:
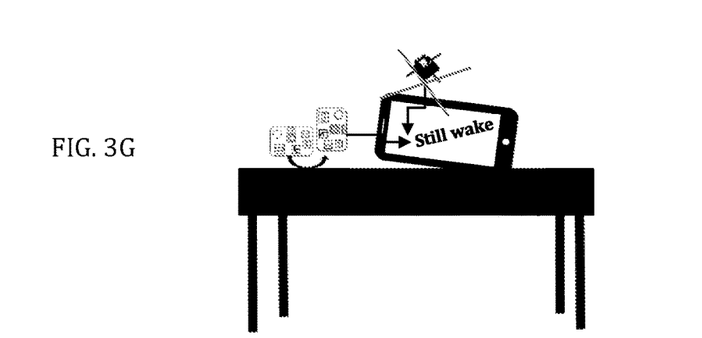

FIG. 3G illustrates an example of a solution for the problem demonstrated in FIG. 3E, showing the blocking of the relevant channel data received from the integrated accelerometer. After the external accelerometer is paired and connected to the device, the code elements related to the sleep mode, which typically search for movement data from the integrated accelerometer, are completely blocked, and instead, the device OS will start to receive this movement data only from the external accelerometer.

Figure 4A:
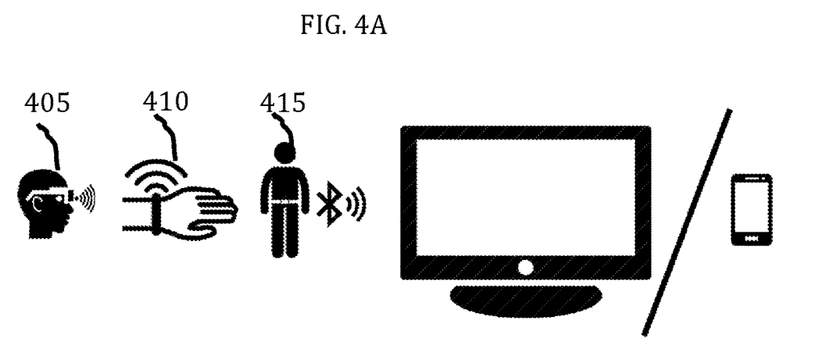
FIGS. 4A-4B show examples of new uses or applications made possible by the present external movement sensor.
Figure 4B:
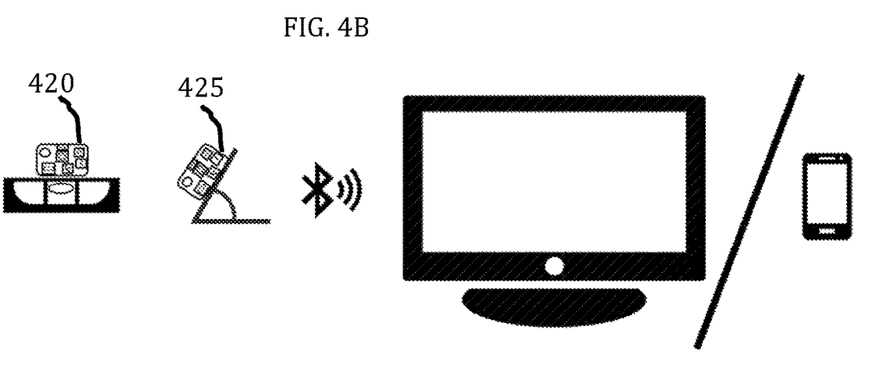

FIGS. 4A-4B illustrate several examples of new uses or applications made possible by external movement sensor, using the present invention, according to some embodiments.

FIG. 4A illustrates additional uses of controlling existing games and applications running on stationary or mobile computing devices by external movement sensor 100. As can be seen, the user can control applications by tilting the external movement sensor 100 with his/her body parts, for example head 405; hands 410; pelvis 415, optionally attached to a belt. Furthermore, the user can attach the external movement sensor 100 to another accessory, thus enabling new functions, for example, using the application for games, training, rehabilitation, sports, etc.

FIG. 4B illustrates examples of other uses of the invention on existing apps, for example, using an existing Application to measure movement, acceleration or angles by the external movement sensor 100 without requiring the physical location of the smartphone 50 on the object being measured. As can be seen at 420 and 425, movement of external tools may trigger app usage on a mobile and/or stationary device. In further examples, an external movement sensor may be coupled to a leveling tool, angle tools, vibration sensors, or any other external tools where acquiring of movement data may be useful.

Figure 5:
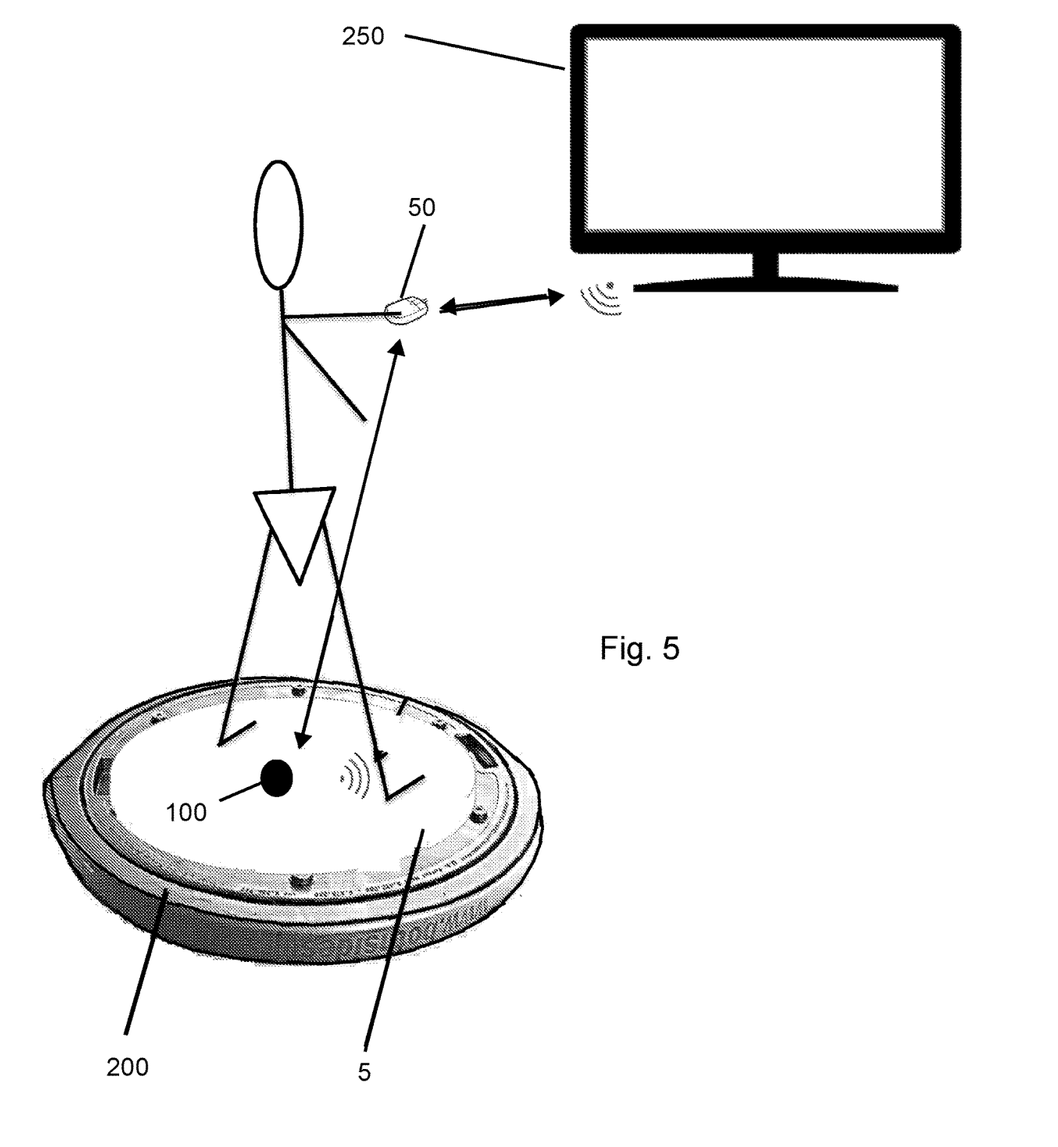
FIG. 5 is a schematic illustration of an exemplary usage of the present system.

FIG. 5 shows an exemplary usage of the present system and methodology. A user is standing on a surface 5 of a balance trainer 200, holding his/her smartphone 50 in his/her hand (although the smartphone could be conveniently located in the user's pocket or elsewhere) while playing an interactive game by way of a smart television 250. Smartphone 50 receives movement, acceleration and orientation data from movement sensor 100 situated on surface 5 of balance trainer 200; and the smartphone 50 communicates that data to smart television 250, which the user is viewing. In this way, smartphone 50 communicates the proper movement, acceleration and orientation data, i.e. the data from movement sensor 100, and not such data that the smartphone can generate, the OS of the smartphone is configured with and running a file integrated therein that neutralizes such smartphone-generated movement data (or blocks communication thereof). As a result, the balance training game or exercise can be performed properly and conveniently without a need to somehow attach smartphone 50 to the balance trainer's surface 5. Further, such (typically low cost) movement sensor's 100 can be attached to a variety of surfaces/games.

It should be noted, that the herein described system and method is allows direct communication between movement sensor(s) 100 and computing device(s) such as smartphone 50; and that the sensor(s) and device(s) are separately located (the sensor(s) is external to the computing device—not integrated. Such a situation allows separate usage of both the computing device and the movement sensor(s).

According to some embodiments, both external and internal/integrated accelerometers and/or gyroscope are used, and/or other movement related sensors are used. For example, selected channels external accelerometers and/or gyroscope may be selectively turned off or left on, in order to allow internal accelerometers and/or gyroscope to provide data to the device for selective functions, and to allow external accelerometers and/or gyroscope to provide data for selective functions.

According to some embodiments, functions on the device may conditionally use external accelerometers and/or gyroscope. For example, the OS of a smart phone device may use internal and/or external accelerometers and/or a gyroscope device to perform functions until the external accelerometers and/or gyroscope is connected and/or paired. Furthermore, if an external movement sensor(s) (e.g. accelerometer and/or a gyroscope) is paired and being used, and subsequently is disconnected or unpaired, the internal movement sensor(s) takes over the provision of movement data.

The foregoing description of embodiments of the invention has been presented for the purposes of illustration and description. It is not intended to be exhaustive or to limit the invention to the precise forms disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the scope of the invention.

The invention claimed is:

1. A movement communication system, comprising:
  a computing device comprises a movement supporting Operating System (OS), wherein the movement supporting OS comprises a code configured to execute commands which, when executed, enable the computing device to:
  receive data from at least one external movement sensor;
  modify the movement supporting OS code to block a usage of the computing device internal movement sensors based on the received data;
  open a dedicated data channel to receive movement data from the at least one external movement sensors according to the modified code; and
  enable internal movement data of the computing device internal movement sensors to be used by non-movement applications on different channels.

2. The movement communication system of claim 1, wherein the OS is a *Nix OS.

3. The movement communication system of claim 1, wherein the OS comprises a file configured with instructions to execute commands to enable selective usage of the internal movement sensors of the computing device.

4. The movement communication system of claim 1, wherein at least one external movement sensor comprises a central processing unit configured to:
  transmit data to the computing device a modifying code file by a wireless sensor communication unit, wherein the modifying code file is configured to:
  modify an OS code to block usage of the internal movement sensors;
  open a dedicated data channel to communicate movement data from the at least one external movement sensor; and
  enable internal movement data of the internal movement sensors of the computing device to be used by non-movement applications on different channels.

5. The movement communication system of claim 4, wherein the wireless sensor communication unit comprises a Bluetooth chip configured to pair with the computing device.

6. The movement communication system of claim 5, wherein the internal movement sensors are blocked when the at least one external movement sensor and the computing device are paired.

7. The movement communication system of claim 1, wherein the at least one external movement sensor comprises at least one of an accelerometer and a gyroscope configured to sense a movement of a user.

8. The movement communication system of claim 1, wherein the modified OS code is configured to block the usage of internal sensors movement data by one or more movement applications.

9. A computing device comprising a plurality of internal movement sensors and a *Nix based OS, wherein the *Nix based OS comprises a file configured with instructions to execute commands which, when executed, configure the computing device to:
  receive data from at least one external movement device;
  modify the file to block a usage of the plurality of the internal movement sensors of the computing device based on the received data;
  open a dedicated data channel to receive movement data from the at least one external movement device according to the modified file; and
  enable internal movement data of the plurality of the internal movement sensors of the computing device to be used by non-movement applications on different channels.

10. The computing device of claim 9, wherein the file is modified to include instructions to execute commands to operate an application that enables a selective usage of said at least one external movement device, wherein the movement data is configured to operate the application by using the movement data received from the at least one external movement device having one or more external sensors.

11. A method of facilitating direct communication between a computing device that comprises internal movement sensors and runs a *Nix OS on a dedicated channel and at least one external movement sensor having a wireless sensor communication unit, the method comprising:
  receiving data from at least one external movement device;
  modifying an operating system (OS) code to block a usage of the internal movement sensors based on the received data;
  opening a dedicated data channel to receive movement data from the at least one external movement sensor according to the modified OS code; and
  enabling internal movement data of the internal movement sensors of the computing device to be used by non-movement applications on different channels.

12. The method of claim 11, comprising selective usage of one or more external movement sensors and one or more internal movement sensors.

13. The method of claim 12, comprising running a plurality of *Nix OS supported treatment applications on the computing device, wherein the training games use movement data communicated from the one or more external movement sensors to the *Nix OS.

14. The method of claim 12, comprising running a plurality of *Nix OS supported challenge games on the computing device, wherein the training games use movement data communicated from the one or more external movement sensors to the *Nix OS.

15. The method of claim 11, comprising running a plurality of *Nix OS supported training games on the computing device, wherein the training games use movement data communicated from the one or more external movements sensors to the *Nix OS.

16. The method of claim 11, comprising running a plurality of *Nix OS supported training applications on the computing device, wherein the training games use movement data communicated from the one or more external movements sensors to the *Nix OS.

\* \* \* \* \*